July 4, 1944. W. MORTON ET AL 2,352,652
METHOD OF PRODUCING DRAWN MOISTURE-PROOF ARTICLES
Filed Aug. 3, 1939
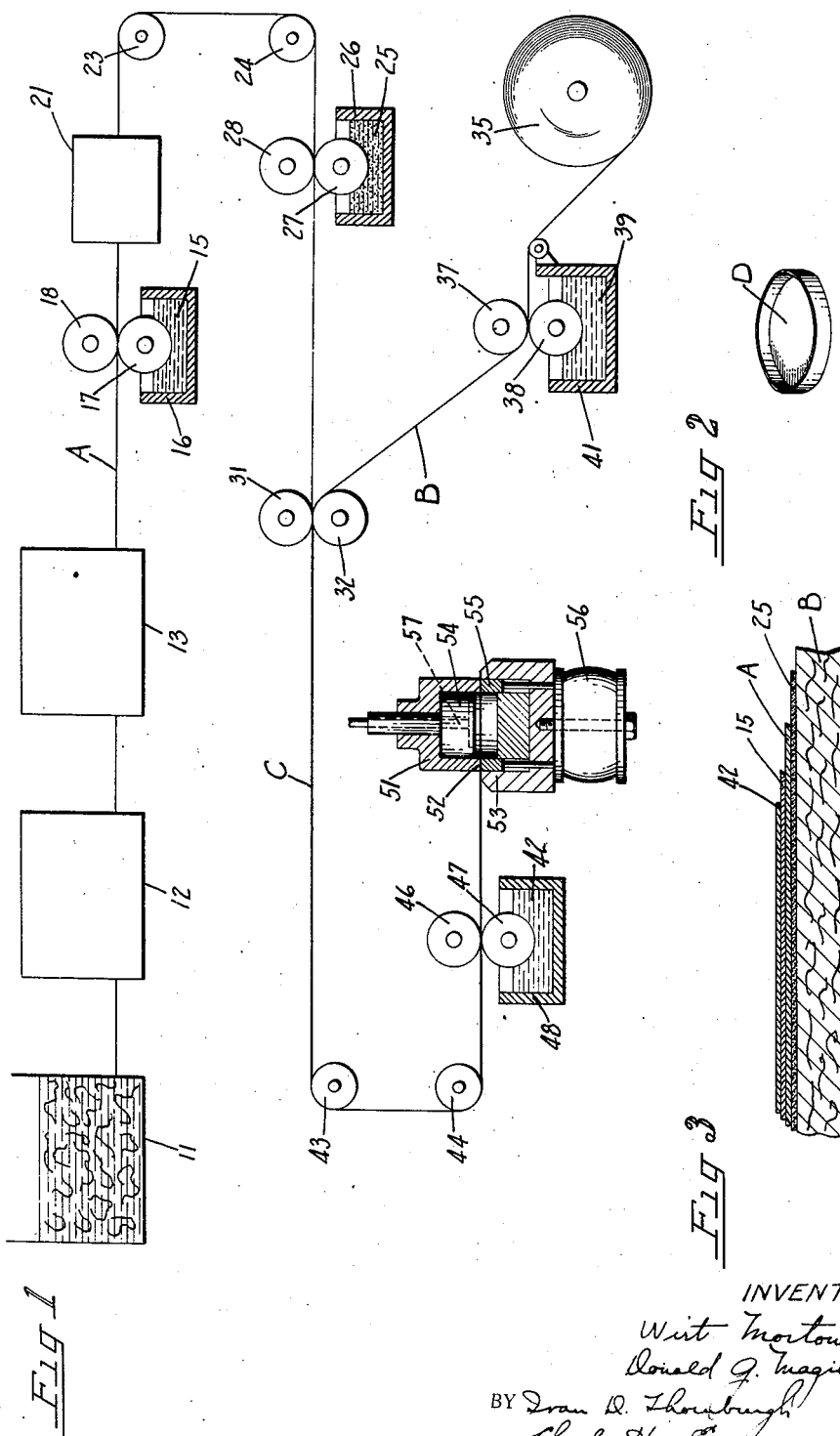
INVENTORS
Wirt Morton
Donald G. Magill
BY Ivan D. Thornburgh
Charles H. ...
ATTORNEYS Patented July 4, 1944

2,352,652

UNITED STATES PATENT OFFICE 2,352,652

METHOD OF PRODUCING DRAWN MOISTUREPROOF ARTICLES

Wirt Morton, Lake Forest, Ill., and Donald G. Magill, Great Neck, N. Y., assignors to American Can Company, New York, N. Y., a corporation of New Jersey Application August 3, 1939, Serial No. 288,224

1 Claim. (Cl. 113—51)

The present invention relates to a method of producing die drawn moisture-proof articles such as fibre container parts and has particular reference to producing such articles from a laminated paperboard stock coated with a moisture-proofing lacquer which will withstand a drawing action in a die.

In the manufacture of moisture-proof container parts from fibreboard it has been found unsatisfactory to apply a moisture-proofing solution directly to the fibreboard itself because of the porosity of the board. It is desirable, however, to apply a thin sheet of impervious paper or foil to the exterior surface of a fibreboard base and then coat the surface of the paper or foil with a moisture-proofing solution thereby providing a laminated paperboard having a moisture resisting surface. Such a laminated covering for the fibre base serves two purposes. It satisfactorily moisture-proofs the fibre base and enhances the appearance of the container part produced therefrom particularly if properly colored.

However, considerable difficulty has been encountered in producing drawn articles such as container slip covers, shallow bodies and the like from such a composite board. The drawing action subjects the outer layer of foil or paper which is secured to the base, to considerable strain which usually causes it to tear away from the base, leaving exposed and unprotected areas on the finished article.

The present invention contemplates overcoming this difficulty by providing a method of producing die drawn articles from laminated paperboard which is made up from a dampened fibre base having a coating of colored glassine or other greaseproof paper or base coating adhesively secured thereto and having the outer surface of the glassine coated with a moisture-proofing lacquer which will cause the glassine to withstand the severe action of a die.

An object therefore of the invention is the provision of a method of producing die drawn moisture-proof container parts wherein a greaseproof paper, having one side coated with a moisture-proofing lacquer which will withstand a die drawing action without breaking or cracking, is united by means of adhesive with a dampened fibreboard and the resulting laminated moisture-proof paper stock is then formed into moisture-proof drawn container parts.

Another object is the provision of a method of this character wherein a coating of lubricant is applied over the moisture-proofing lacquer on the exterior surface of the laminated paperboard so that drawing of the paperboard into container parts in a die will be greatly facilitated.

Numerous other objects and advantages of the invention will be apparent as it is better understood from the following description, which, taken in connection with the accompanying drawing, discloses a preferred embodiment thereof.

Referring to the drawing:

Figure 1 is a diagram schematically showing the steps of the instant improved method constituting the invention wherein is illustrated principal parts of suitable apparatus for carrying out such steps;

Fig. 2 is a perspective view of a finished drawn container part made according to the steps of the method invention; and Fig. 3 is an enlarged sectional view of the laminated paperboard from which the container parts are made.

By way of illustration of a preferred form of carrying out the instant method invention, Fig. 1 shows the making of a grease-proof paper A, preferably of the glassine type, coating one side of this paper with a moisture-proof lacquer, bonding the coated paper with a waterproof adhesive to a strip of fibreboard B thereby forming a laminated paper stock C, and then cutting out and drawing sections of this laminated stock into container parts. In the drawing a slip cover D, such as may be used for salt cans, is shown by way of example.

Although the drawing diagrammatically illustrates a continuous or connected set-up of elements for performing these operations in sequence on continuous webs of the fibrous material, it should be understood that in commercial practice certain breaks in continuity may be necessary. For example, the web of glassine as it comes from the paper mill will usually be wound up into a roll for shipment or storage. Further treatment of this paper such as at the time of application of the moisture-proofing lacquer, may require unreeling and rewinding.

Again when the glassine and the fibre base are secured together there may be required other unreeling of the paper and in fact the laminated paper stock when produced is usually rolled up for storage before being used. Other such obvious operations may be interposed at various points of manufacture in the commercial production of the container parts under consideration but these need not be enlarged on in this presentation by example of the invention.

The glassine or grease-proof paper A is produced by first mixing bleached sulphite pulp in a beater 11 (Fig. 1) of a regular paper mill and is processed in the beater for the customary length of time to reach a sufficient amount of hydration. To this pulp while in the beater, is added the required amount of titanium dioxide to render the resulting glassine opaque, since otherwise it would be transparent. This opaque condition is desirable in order to hide the dark color of the fibreboard base on which the glassine is subsequently secured.

During the beating operation there may be also added to the pulp, organic dyes to produce a color in the finished glassine as this gives it a more pleasing appearance. There is also added in the beater about one and one-half percent resin sizing material which when precipitated with aluminum sulphite fixes the color and holds the titanium dioxide into the fibrous mix, thereby preventing these ingredients from being lost in the usual wash waters.

This mixture of pulp and the above described ingredients is made into a web of paper on a regular Fourdrinier machine which is indicated in the drawing by the numeral 12. This paper web is then supercalendered in the usual manner in a calendering machine 13. The resulting paper mass as it comes from the calender, is a solid, dense, grease-proof web of glassine which is opaque and which is of a distinct color. It is such a web which is indicated by the letter A.

One side of the web of glassine A is next coated with a transparent moisture-proofing solution which when dry will be flexible, resilient and tough. It will not break or crack under the strains of a drawing die when the paper to which it is applied is subjected to a drawing operation. Such a moisture-proofing coating is preferably a nitro-cellulose lacquer having a very high cotton number and containing approximately thirty percent synthetic resin and between three and four percent paraffin wax.

This moisture-proofing lacquer is indicated by the numeral 15 and is preferably retained within a reservoir 16 mounted adjacent the path of travel of the web of glassine. An applying roller 17 rotated in the lacquer applies the latter to the lower surface of the glassine web while a pressure roller 18 mounted above the applying roller 17 presses the web against the latter roller. These rollers also serve as feeding rollers for advancing the web along its path of travel.

The lacquer 15 is preferably dried immediately after its application to the web. For this purpose there is provided a suitable oven 21 disposed adjacent the lacquer reservoir 16. The coated web of glassine is passed through this oven.

From the drying oven the moisture-proof coated web A preferably passes over an idler pulley 23 and extends down over a second idler pulley 24 so that the uncoated side of the web will be lowermost. To this uncoated surface there is then applied a water-proof adhesive 25 preferably of the casein type. The adhesive is retained in a tank 26 in which an applying roller 27 rotates. The rotating roller carries the adhesive up onto the web while a pressure roller 28 presses the web against the applying roller. These rollers also serve as feeding rollers for advancing the web. The moisture-proofed and adhesive coated web A then passes to a pair of mounting rollers 31, 32 where it meets the strip B of the fibreboard base.

The fibre base strip B is preferably unrolled from a supply reel 35 and is immediately dampened to a degree wherein about fifteen percent moisture content is present. This moisture is imparted to the board preferably by passing the strip between a pressure roller 37 and a moisture applying roller 38. The applying roller rotates in a bath of water 39 retained in a vessel 41. The rollers also serve as feeding devices for advancing the strip B.

After dampening, the strip B passes up over the lower mounting roller 32 where it meets and registers with the glassine web A. The superimposed glassine web A with its strip B now passes between the mounting rollers 31, 32 and are pressed tightly together into the composite laminated paper board C, the parts of which are bonded together by the waterproof adhesive 25. Since the fibre base is damp, the adhesive should be of a waterproof nature.

By referring to Fig. 3 of the drawing it will be readily seen that the composite paperboard thus formed comprises a plurality of laminations or layers which include the fibre base B, the waterproof adhesive 25, the colored glassine paper A, and the moisture-proof lacquer 15 which is now the outer surface of the paper stock. It is this paper stock from which the container cover D is produced by drawing in a die.

To facilitate the drawing action a light coating of a lubricant 42, preferably a dilute solution of glycol stearate or other suitable liquid or semi-liquid is applied over the moisture-proof lacquered surface. In order to readily apply the lubricant, the paper stock C preferably passes over an idler roller 43 and then extends down over a second idler roller 44 from which it passes between a pressure roller 46 and a lubricant applying roller 47. The applying roller rotates in a bath of the lubricant 42 which is retained in a trough 48 disposed adjacent the path of travel of the paper stock C as the latter advances between the rollers. These rollers 46, 47 also serve as feeding devices for the paper stock.

The lubricated web C preferably passes directly into a drawing die mechanism which cuts out a blank and draws it into the desired container cover D. If desired the blanks may first be cut out in a blanking die and then stacked and subsequently fed into a drawing die for drawing the cover into shape.

However, these operations may be combined in one blanking and forming die mechanism, such as that illustrated in the drawing. Such a die mechanism includes a vertically reciprocating punch 51 having a cut edge 52 which cooperates with a die cut-edge 53 to cut out a blank. Upon the same cutting stroke of the punch 51 an internal drawing punch 54 moves down into the die and draws the blank over a floating draw ring 55 which is backed up by a rubber 56. This is a usual drawing die construction for such an operation. On the upward stroke of the punches 51, 54 an ejector rod 57 housed within the punch 54 ejects the drawn cover D from the punch. This completes the formation of the cover.

This drawn cover, which is the article resulting from the foregoing steps, carries the opaque, colored and moisture-proofed glassine on its exterior surface. The appearance of such a cover is greatly enhanced as an improved article by having the moisture-proof lacquer over the glassine as a uniform unbroken coating. This protects the cover and increases its resistance to moisture vapor to protect the contents of the finished container.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

In a method of drawing composite laminated moisture-proof cup-shaped fibre container parts in a continuous operation from an advancing web of fibre base stock material wherein the layer of the stock comprising the exterior surface of said container part consists of greaseproof colored opaque glassine paper: the step of applying a liquid lubricant composed of a dilute solution of glycol stearate to the exposed outer surface only of said glassine sheet to facilitate the subsequent drawing action, whereby said composite moisture proof drawn container parts are insured against the presence of cracks and unprotected areas in said glassine paper constituting the outer protective portion of the container part.

WIRT MORTON.
DONALD G. MAGILL.